Figure 1:
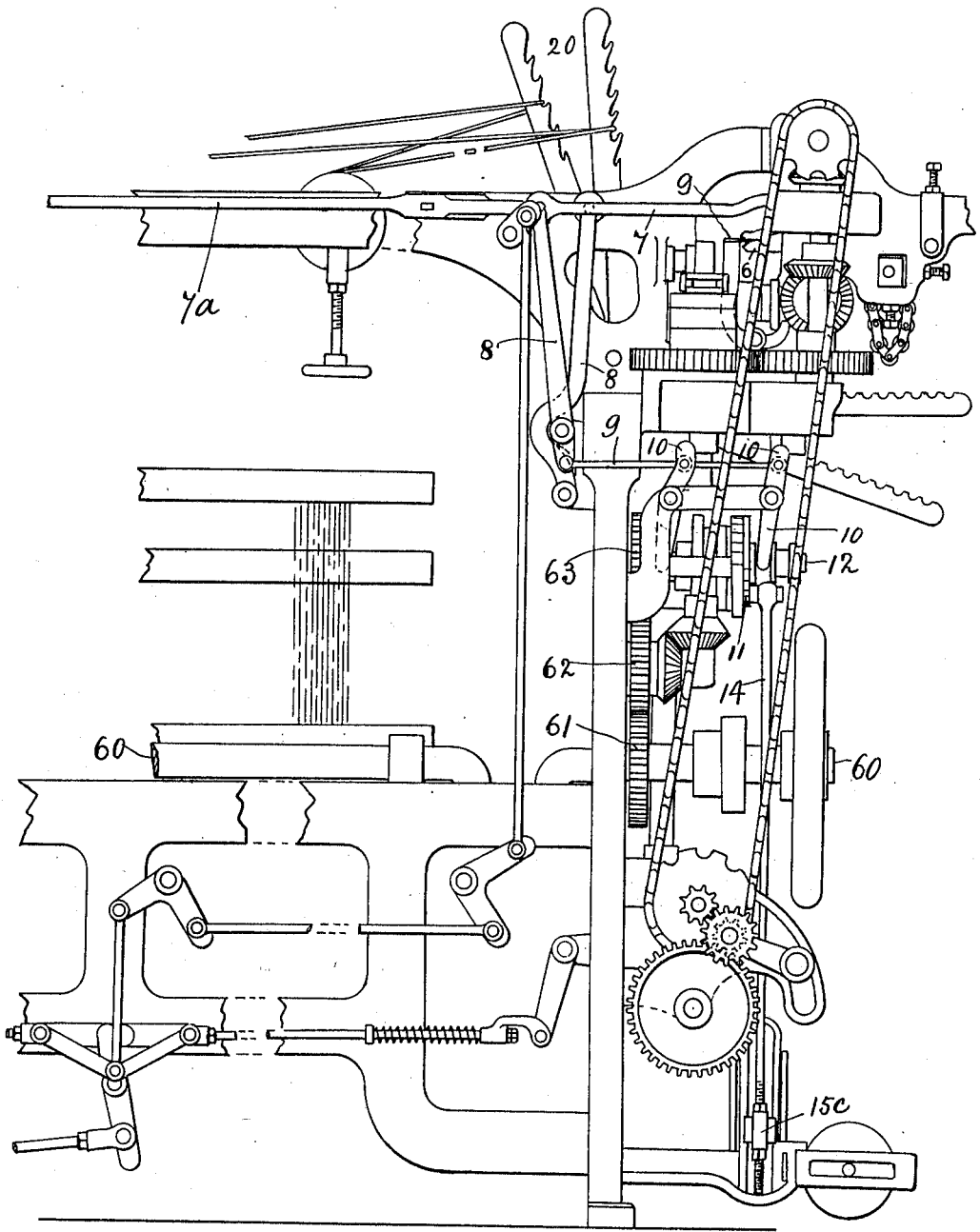

D. NICHOLS.
HEALD AND SHUTTLE BOX OPERATING MECHANISM OF LOOMS.
APPLICATION FILED SEPT. 5, 1908.

978,329.

Patented Dec. 13, 1910.
6 SHEETS—SHEET 1.

Witnesses
Inventor
David Nichols
Attorneys

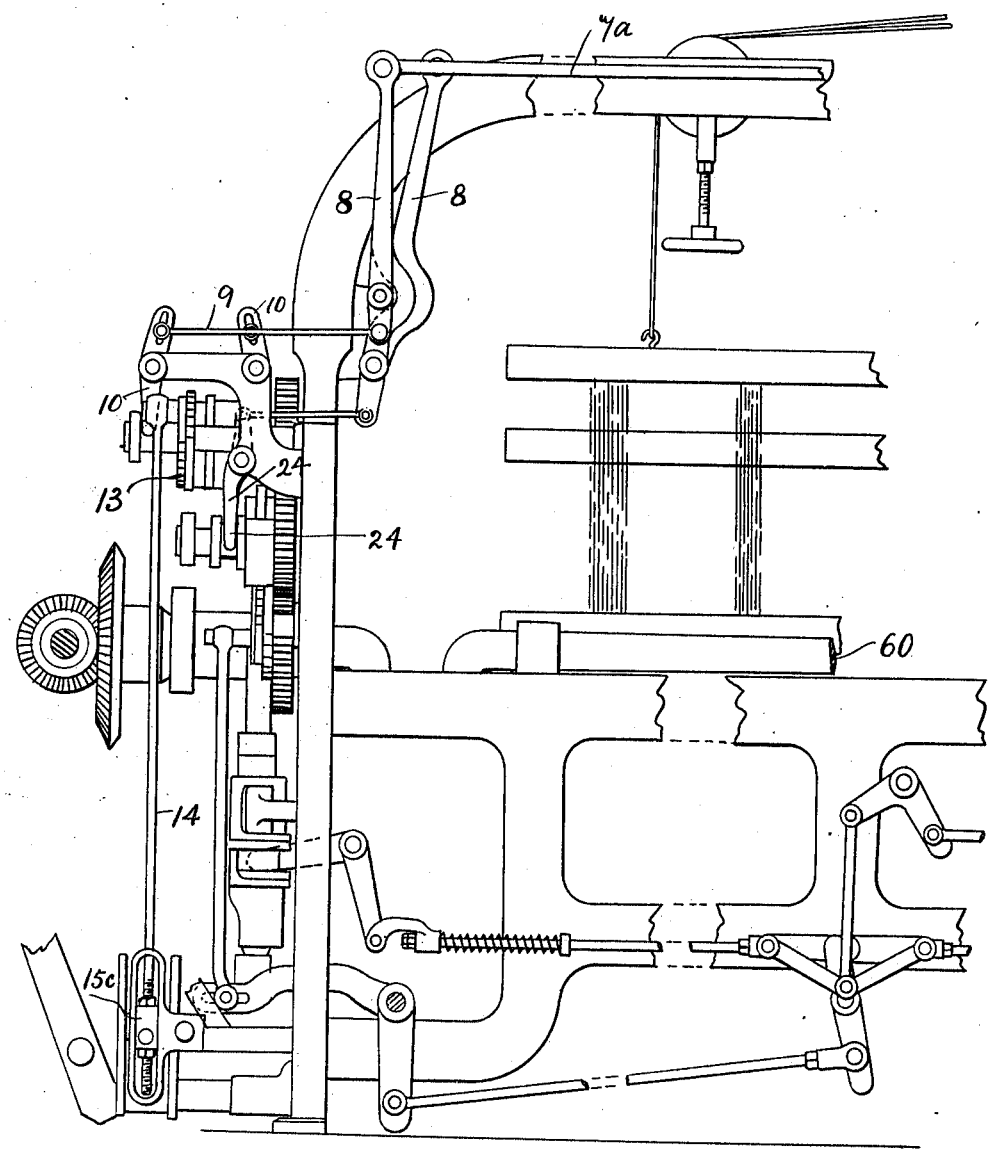

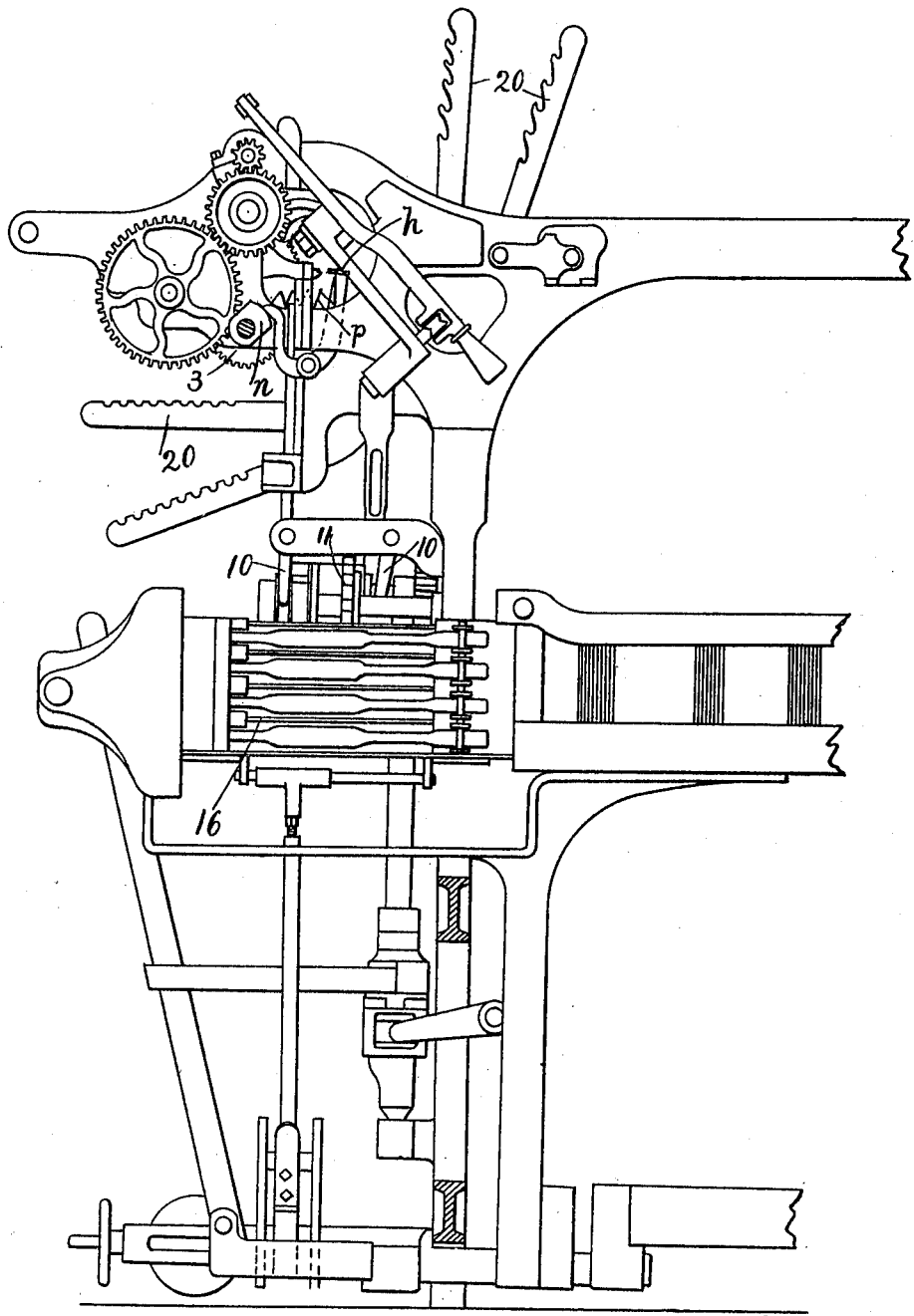

D. NICHOLS.
HEALD AND SHUTTLE BOX OPERATING MECHANISM OF LOOMS.
APPLICATION FILED SEPT. 5, 1908.

978,329.

Patented Dec. 13, 1910.
6 SHEETS—SHEET 4.

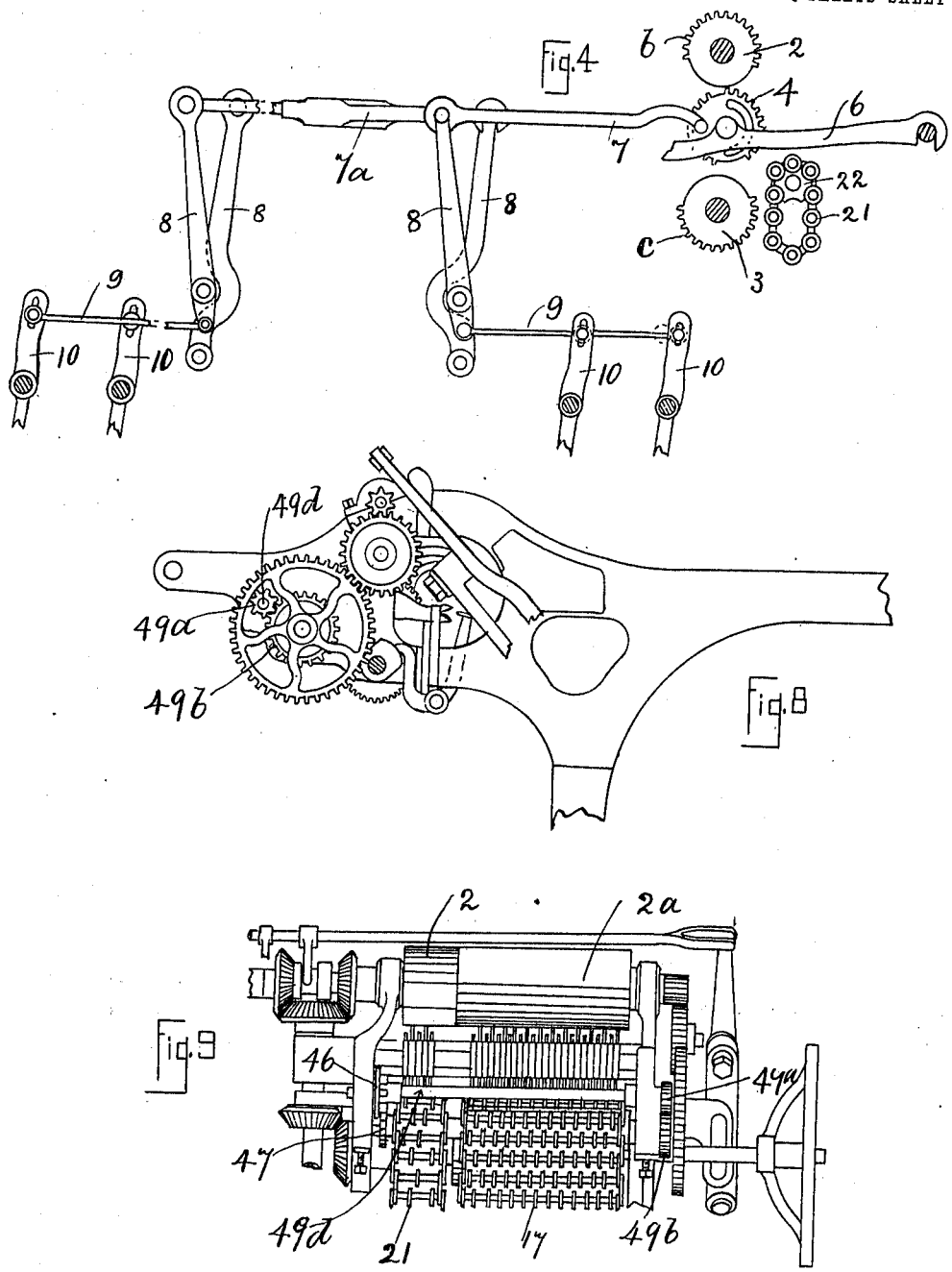

D. NICHOLS.
HEALD AND SHUTTLE BOX OPERATING MECHANISM OF LOOMS.
APPLICATION FILED SEPT. 5, 1908.
978,329.
Patented Dec. 13, 1910.
6 SHEETS—SHEET 6.
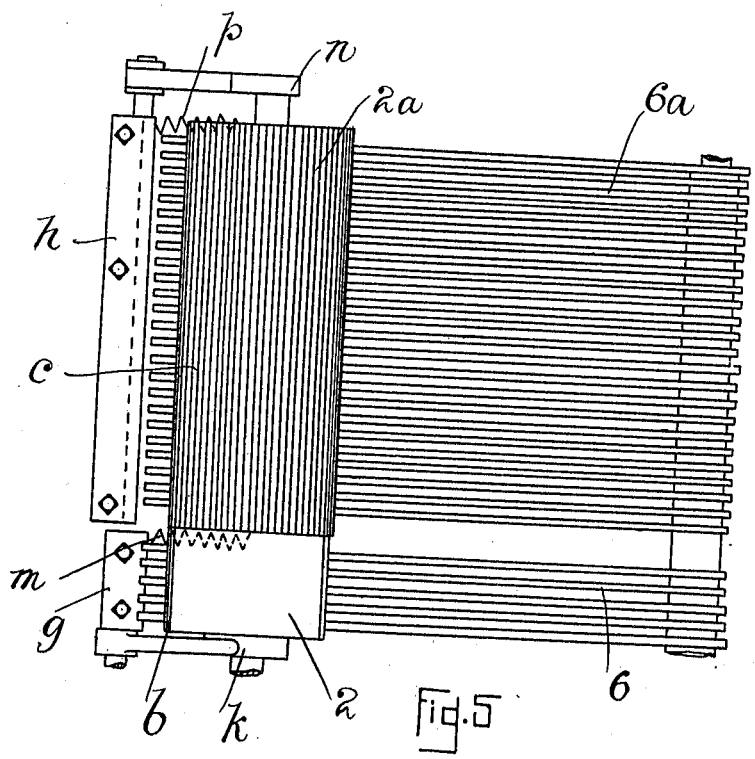
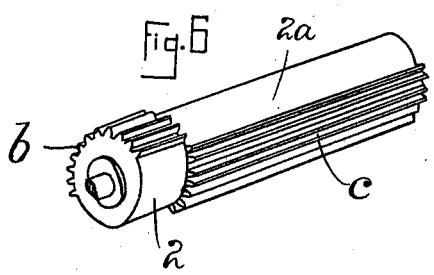
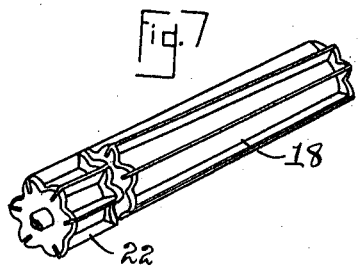

UNITED STATES PATENT OFFICE.

DAVID NICHOLS, OF SHIPLEY, ENGLAND, ASSIGNOR TO GEORGE HODGSON LIMITED, OF BRADFORD, ENGLAND.

HEALD AND SHUTTLE-BOX OPERATING MECHANISM OF LOOMS.

978,329. Specification of Letters Patent. Patented Dec. 13, 1910.

Application filed September 5, 1908. Serial No. 451,847.

*To all whom it may concern:*

Be it known that I, DAVID NICHOLS, a subject of the King of Great Britain, and resident of 80 Manor Lane, Shipley, in the county of York, England, have invented certain new and useful Improvements Relating to Heald and Shuttle-Box Operating Mechanisms of Looms, of which the following description, together with the accompanying sheets of drawings, is a specification.

It has reference to the class of looms wherein dobby or heald operating mechanism, consisting of toothed-crank wheels actuated by partly toothed drums, is made use of, the same looms having shuttle-boxes of the type known as "drop-boxes" or those having shuttle boxes which have rising and descending motions transmitted to them, and the object of this invention is to so construct and arrange certain parts in connection with the heald operating mechanism of the class referred to and the pattern surface which controls same, that shuttle-box operating mechanism actuated from or by one of the main shafts of the loom such as mechanism of the type described in British Patent specifications No. 16110 of 1886 and No. 18037 of 1893 may be used in connection therewith and by having its pattern surface mechanism so constructed and connected to that which controls the heald operating mechanism that the one may be kept in unison or concert with the other whether the loom is working in the ordinary manner to carry out the process of weaving or whether it is moved to carry out the process of "lagging" back.

Hitherto in looms provided with toothed crank wheel dobbies, certain of the dobby crank wheels have been used for the purpose of raising and lowering the shuttle boxes into position. This arrangement puts considerable stress on such crank wheels and their connections and causes excessive wear and liability to breakage of parts and also puts a considerable strain upon the weaver while lagging back by hand.

According to the improvements described in the specifications of British Patents Nos. 16018 and 16019 of 1907 the part of the dobby mechanism which is used in connection with the shuttle boxes is only made use of to put separate shuttle box operating mechanism into and out of action so that in lagging back the weaver is relieved of the strain of moving the shuttle boxes and the wear and strain on the parts is reduced, while at the same time the various parts are so arranged that the heald pattern mechanism and the shuttle box and picking pattern mechanism and if desired the take up motion, shall rotate in unison in either direction preserving their proper relation to one another whether the dobby mechanism is connected with or disconnected from the loom.

According to the present invention I utilize certain of the toothed crank wheels of the dobby for the purpose of putting the shuttle box operating mechanism into and out of action and while obtaining the advantages above mentioned I also secure that the putting of the shuttle box operating mechanism into and out of action shall be performed positively, and as the result of my invention a more efficient machine is obtained capable of working at a greater speed.

In the accompanying sheets of drawings which are illustrative of my invention as applied to a loom of the kind described provided with the shuttle box operating mechanism described in British specifications Nos. 16110 of 1886 and No. 18037 of 1893:—

Figure 3:
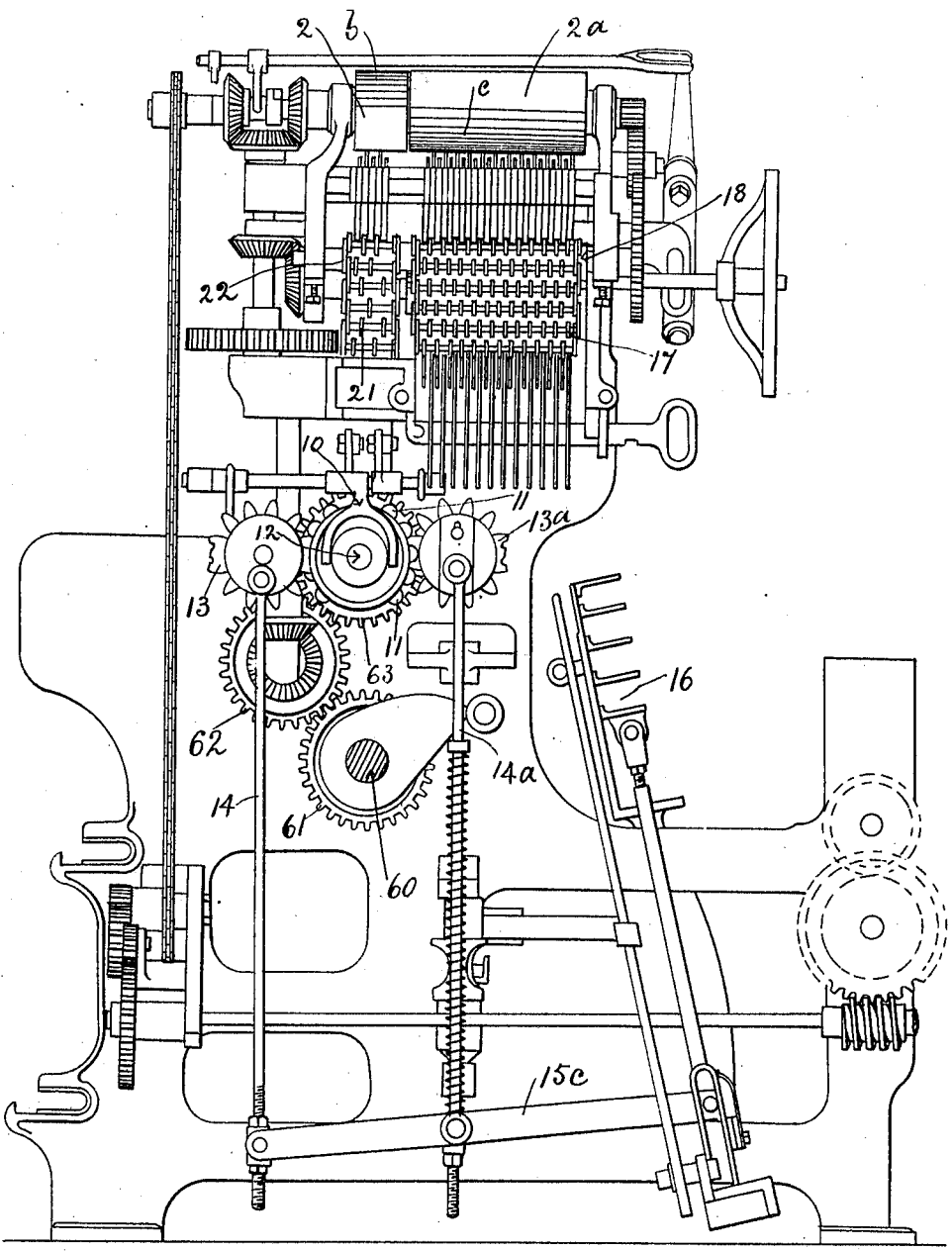

Figure 1 is a back elevation of sufficient of the dobby side of a loom to show the construction and arrangement of same in accordance with my invention. Fig. 1$^A$ is a similar view to Fig. 1 but illustrates the other or opposite side of the loom. Fig. 2 is front elevation of sufficient of one end of a loom to illustrate the application of my invention. Fig. 3 is an end elevation of the parts shown by Fig. 2. Fig. 4 is an elevation illustrating the arrangement of certain parts hereinafter described. Fig. 5 is a plan of certain of the parts shown by Fig. 3 but with their relative positions altered. Fig. 6 is a perspective view showing the relative positions of the two sets of teeth on a segment drum. Fig. 7 is a perspective view showing the relative positions of the two pattern cylinders as arranged in accordance with my invention. Figs. 8 and 9 are front and end elevations of parts hereinafter referred to.

In carrying out my invention I make use of the dobby mechanism wherein the partly toothed drums 2, 3 are employed for transmitting motion to crank wheels 4$^a$ to effect the rising and descending movements of the healds 5. I employ certain crank wheels 4 (shown by Fig. 4) which are carried by the vibrator levers 6 to transmit motion by connecting rods 7, levers 8, rods 9, and forked levers 10 to the continuously rotating partly toothed wheels 11, which they slide upon a sleeve mounted on the shaft 12 in order to place same into and out of gear with the crank wheels 13, 13ª, which latter by the rods 14, 14ª, and box lever 15°, effect the rising and falling movements of the shuttle-boxes 16. Thus the pattern surface 17 on the barrel 18 is brought into use to control or effect the movements of the healds through the heald or jack levers 20 while the pattern surfaces 21 are used to control the motion of the shuttle-boxes 16, but only for the purpose as before stated, of putting the wheels 11, and 13, 13ª, positively into and out of gear so that the loom's prime motor shaft 60 is thereby brought into use to effect the movements of said shuttle boxes. The shaft 60 is coupled to (so as to positively rotate) a sleeve on the shaft 12 by the gearing wheels 61, 62 and 63 to the latter of which the sleeve is coupled in manner well known. For actuating the shuttle boxes 16 on the opposite end or side of the loom to that on which the dobby mechanism is mounted, another box lever 15° is employed as are also rods 14, 14ª crank wheels 13, 13ª partly toothed wheel 11, forked levers 10 and rods 9 (all of which are mounted on said end of the loom) and these are coupled to levers 8 which are through the connecting rods 7ª actuated as before stated by the crank wheels 4 in the dobby mechanism. Similar connecting devices are also used to actuate the forked lever 24, which engages the devices for effecting the changes in the picking or shuttle actuating mechanism in the well known manner. Since the toothed-crank wheels 4 are used for thus governing the actions of the shuttle boxes 16, while the toothed crank wheels 4ª (see Fig. 4) are employed in well known manner to actuate the healds by operating the jack-levers 20, it is obvious that such toothed-cranks 4 must be actuated at a different time to those 4ª which are used for operating the healds. To effect this difference in time of action I adjust those parts 2 and 3 of the segment drums which operate them to have their teeth $b$ out of alinement with the teeth $c$ of the other parts 2ª and 3ª of the said drum which actuate the jacks 20. This alteration in the relative positions of the two sets of teeth $b$ and $c$ may extend to the full limit in which positions one set will be in working position while the other is traveling through the inoperative part of its path of motion as shown by Figs. 5 and 6, or such adjustment of the two sets may be carried out to any required extent less than said extreme as occasion may necessitate.

To enable the pattern surface 21 (which is carried by the pattern barrel 22) to be adjusted to actuate the crank wheels 4 at the proper time relatively with the pattern surface 17 (carried by the barrel 18) which actuates the crank wheels 4ª, the pattern barrel 22 is made so that it may be adjusted and secured in any desired position on the axial shaft of the barrel 18 as shown by Fig. 7. And since it is usual to have the pattern barrels for the type of dobby mechanism herein employed and referred to, actuated continuously and not intermittently nor at one part quicker and at another part slower in any given revolution, it will be seen that the adjustability of one pattern barrel, as the barrel 22 relatively with the other 18 is desirable in order that each may act at the required time. However should it be desired to actuate the barrel 22 in intermittent stages then I may mount it loosely upon the shaft of the barrel 18 or upon a separate shaft and transmit motion from the barrel 18 or its shaft to the barrel 22 by any known means or by the wheels 49ᵇ, and 49ª, shaft 49ᵈ, and pegwheel 46 to the star wheel 47 which is secured, so as to transmit motion to said barrel 22 as shown by Figs. 8 and 9 and as described in British specification No. 16018 of 1907.

In order that the toothed-cranks 4 for governing the shuttle-boxes 16 as well as those 4ª which actuate the jack levers 20 (and which are in accordance with my arrangement above described carried out at different times or periods) may be locked in gear with their respective drums 2, 3 and 2ª, 3ª, in manner well understood, I arrange the locking bar $g$ for acting in conjunction with the levers 6 to lock the crank-wheels 4, to be separate from the bar $h$ for acting in like manner with the levers 6ª to lock the crank wheels 4ª, and I preferably mount the cam $k$ and spring $m$ for actuating the bar $g$ on one side of the machine while I mount the cam $n$ on the other side thereof so that it and its spring $p$ may operate the bar $h$ quite independently of the bar $g$, thus the adjustment of these independent locking mechanisms may be effected as occasion requires to coöperate with the segment drums 2, 3 and 2ª, 3ª and the pattern surfaces 17 and 21.

It is obvious that when the proper relative positions of the two pattern barrels 22 and 18 are found, if no further alteration in their adjustment is desired, these barrels may be both permanently fixed or formed on one and the same axle or axis so that one is integral with the other and similarly the two parts $b$ and $c$ of the partly toothed drums 2ª and 3ª may be permanently fixed or formed in one piece.

I have described my invention with reference to a loom provided with shuttle box operating mechanism such as is described in British specifications No. 16110 of 1886 and No. 18037 of 1893 but it is obvious that any form of shuttle box operating mechanism which is driven from one of the main shafts of the loom and is put into and out of action by means of a sliding clutch device or its equivalent may be used without departing from my invention.

Such being the nature and object of my invention what I claim is:—

1. An improvement in looms comprising mechanism for operating the shuttle boxes, mechanism for operating the healds, and mechanism for controlling said shuttle box operating mechanism and said heald operating mechanism comprising independent crank wheels provided with teeth, partially toothed drums for rotating said crank wheels, vibrator levers for supporting said crank wheels, independent pattern mechanisms for actuating said vibrator levers, the pattern mechanism for the dobby actuating crank wheels acting at a different time from the pattern mechanism for actuating the shuttle boxes, and independent locking devices for said vibrator levers.

2. An improvement in looms comprising mechanism for operating the shuttle boxes, mechanism for operating the healds, and mechanism for controlling said shuttle box operating mechanism and said heald operating mechanism, comprising independent crank wheels provided with teeth, partially toothed drums for rotating said crank wheels, vibrator levers for supporting said crank wheels, independent pattern barrels for controlling the operation of the respective vibrator levers of said dobby and shuttle mechanism respectively, said barrels being relatively adjustable, and independent locking devices for said vibrator levers.

3. In a loom a partly toothed drum, toothed crank-wheels, lever or equivalent means for connecting these crank wheels to the healds, another partly toothed drum in alinement with the former and arranged to act at the opposite time thereto, toothed crank wheels and lever or equivalent connections to couple these latter toothed crank wheels to put the shuttle-box mechanism into and out of action, two pattern barrels mounted in alinement with each other the one being adjusted to control the movement of the healds while the other is adjusted at a different time to control the movements of the shuttle boxes, two locking bars, one for locking the crank wheels which move the healds while the other acts at a different time and locks those which put the box operating mechanism into and out of action, two cams and their lever and spring connections for operating said locking bars at different times substantially as herein specified.

In testimony whereof I have hereunto affixed my signature in the presence of two witnesses.

DAVID NICHOLS.

Witnesses:
FRED HAMMOND,
SAMUEL HEY.